United States Patent [19]

Garvie

[11] Patent Number: 4,579,829

[45] Date of Patent: Apr. 1, 1986

[54] ZIRCON/ZIRCONIA REFRACTORIES

[76] Inventor: Ronald C. Garvie, 63 Morey Rd., Beaumaris, Victoria 3193, Australia

[21] Appl. No.: 680,433

[22] Filed: Dec. 11, 1984

[30] Foreign Application Priority Data

Dec. 13, 1983 [AU] Australia .............................. PG2827

[51] Int. Cl.⁴ ............................................ C04B 35/48
[52] U.S. Cl. ................................... 501/106; 501/102; 501/103; 264/60
[58] Field of Search ............... 501/103, 102, 104, 106, 501/107; 264/60

[56] References Cited

U.S. PATENT DOCUMENTS 3,899,341  8/1975  Schwarz .............................. 501/106
4,152,166  5/1979  Rogers ................................ 501/106

FOREIGN PATENT DOCUMENTS 0668925  6/1979  U.S.S.R. .............................. 501/106

*Primary Examiner*—William R. Dixon, Jr.
*Assistant Examiner*—Karl Group
*Attorney, Agent, or Firm*—Sughrue, Mion, Zinn, Macpeak & Seas

[57] ABSTRACT

A refractory material consists of a zircon matrix with zirconia particles dispersed in it. The zirconia particles comprise from 5 to 30 percent (by weight) of the material. A method of making this material involves milling zircon sand particles and zirconia particles until they have a respective predetermined particle size distribution, adding a fugitive binder, moulding a green ware, firing the green ware at a temperature in the range from 1400° C. to 1800° C., and furnace cooling the fired ware. Preferably the ware is held at the firing temperature for one hour.

14 Claims, 3 Drawing Figures

ZIRCON/ZIRCONIA REFRACTORIES

TECHNICAL FIELD

This invention concerns zircon refractory materials. More particularly, it concerns zircon refractory materials which contain zirconia, and which possess good thermal shock resistance. Such materials are suitable for use in, inter alia, equipment for containing and for handling molten metals.

BACKGROUND ART

Refractory materials for use in equipment for containing and handling molten metals (such components include tundish pouring nozzles and foundry crucibles) have been constructed hitherto using materials which are capable of withstanding severe thermal shock, but which are mechanically weak and have poor wear resistance. Until recently, no ceramic material had been developed which has good thermal shock resistance, good mechnical strength and good wear resistance. The conventional pouring nozzle and foundry crucible, therefore, has been made from a refractory material which is weak, porous, and with a microstructure comprisng coarse grains.

Such conventional refractory materials, as already noted, have good thermal shock resistance. However, their resistance to chemical attack by slag and their resistance to wear by rapidly flowing liquid metal is poor because of the porous, weak nature of the coarse-grained microstructure. In addition, the traditional refractory materials have been impure materials with low melting silaceous (glassy) phases in the grain boundary. The impurities in the materials also contribute to the poor chemical and wear resistance of the traditional refractory materials.

At present, the best commercially available tundish pouring nozzles and foundry crucibles are made of a refractory grade of partially stabilised zirconia (PSZ). This material is expensive and although it has good thermal and mechanical properties, it is not a particularly suitable refractory material for these purposes. For example, the quality of pouring nozzles made with PSZ is very variable. Small amounts of impurities greatly affect the phases formed during manufacture and this has a strong influence on the performance of the product. Glassy material in the grain boundaries softens at the working temperature of the nozzles, and this accelerates erosion of the bore of the nozzles. If any slag is present, the PSZ material is destabilised, such results in even more rapid deterioration of the nozzle.

In a paper entitled "Improved Thermal Shock Resistant Refractories from Plasma-dissociated Zircon", which was published in the *Journal of Materials Science*, volume 14, 1 pp. 817–822, 1979, R C Garvie describes a ceramic material formed from dissociated zircon, and containing particles of zirconia. To form the dissociated zircon, grains of zircon sand were dropped through a plasma furnace. The product of this operation—known as dissociated zircon, often abbreviated to "DZ"—comprises spheres of reactive silica in each of which are embedded crystals of zirconia. The silica spheres are about 200 micrometers in diameter; the zirconia crystals have a diameter of about 0.2 micrometer. To make the ceramic material, Garvie mixed a quantity of milled dissociated zircon with about 10 wt percent of zirconia particles having a means particle diameter of 13 micrometers. The powder batch was then moulded into the desired shape and reaction sintered to produce a fine-grained, strong, dense product which exhibited very good thermal-shock resistance. Examination of this material under a microscope showed that it comprised a matrix phase of zircon grains with a dispersed phase of zirconia particles in the grain boundaries.

Tundish pouring nozzles made from this zircon/zirconia material were tested with similar nozzles made from refractory grade PSZ. The testing was carried out under normal working conditions. A tundish pouring nozzle made of the DZ-zirconia composite was still in use after 37 heats in a small tundish used to contain stainless steel. Refractory grade PSZ nozzles could be used for 1 to 4 heats. In a second trial in a large steel mill, one nozzle of each type was used for one heat. The DZ-zirconia composite nozzle bore showed less wear than the bore of the refractory grade PSZ nozzle at the end of the test.

Although the DZ-zirconia composite materials represent a considerable improvement in the development of an inexpensive, high-performance material to replace refractory grade PSZ, such composites have serious disadvantages. For example the cost of the dissociated zircon/zirconia powder batch, although cheaper than PSZ, is still quite high at $A2.70 per kg. In addition, DZ sinters to a high density during firing, but this is accompanied by a linear shrinkage of about 20% or more. With such a high value of linear shrinkage, dimensional control of the fired product is very difficult and it is necessary to fire the ware at a relatively slow rate of heating to prevent cracking. Also, the DZ-zirconia powder batch cannot tolerate the usual amounts of water present in ceramic processing when the powder is subjected to spray-drying or when a water-soluble wax binder is mixed with the powder. When the powder containing such residual water is moulded by die-pressing in a steel die, the pressed material sticks tenaciously to the die wall, thereby generating such powerful frictional forces that the removal of the green were from the die without fracturing the ware is difficult. It has also been found that the DZ-zirconia powder cannot be moulded by slip-casting, using an aqueous slip, because deflocculation of the slip is very difficult.

DISCLOSURE OF THE PRESENT INVENTION

It is an object of the present invention to provide a material suitable for use in molten metal handling equipment which has similar strength porosity and thermal shock resistance properties to the DZ-zirconia ceramic material, but which is less expensive to produce and which lacks the other disadvantages of that material that have been noted above.

This objective is achieved by producing a ceramic material comprising a zircon matrix in which particles of zirconia are present, but using pure zircon sand as the zircon matrix material instead of using dissociated zirconia.

Zircon refractories, manufactured from zircon sand have been used in the metals industry but because such materials contain zircon in its normal as-mined condition, they contain about 10 percent (by weight) of a clay additive The present inventor has found that if this additive is substantially absent, so that the zircon sand has a purity of 97 percent or greater, the zircon sand can be milled so that it sinters to a high density of about 4.3 g/cc and, surprisingly, undergoes a linear shrinkage during firing of only about 13 percent. This means that more accurate dimensional control of fired ware is possible, and faster and more economical firing rates can be used than when the green ware is made from the DZ-zirconia powder. The milled zircon sand-zirconia powder batch has been found to readily tolerate the residual water content associated with spray-drying and/or the use of water-soluble wax binders. Also, when this powder batch is moulded using conventional water-based slip casting procedures, the problems experienced when moulding a DZ-zirconia powder mix are absent. The fact that a zircon sand-zirconia refractory material has a lower cost than the same material made from DZ-zirconia powder is another significant benefit of the present invention.

It is an important feature of the present invention that both the matrix zircon sand and the zirconia particles are of high chemical purity (at least 97%). In addition, the particle size distribution of the milled powder used to make the materials of the present invention must be within specified limits.

Chemical analysis of preferred zircon sand and zirconia powders are presented in Table 1. The preferred chemical purity of the zircon and zirconia powders are 99.1 and 99.0 wt percent respectively (any hafnia present in the zirconia is not regarded as an impurity; silica in the zircon sand is also not regarded as an impurity).

TABLE 1

Chemical Analyses of Preferred Zircon Sand and Zirconia Powders

| Compound present | Wt percent in zircon sand | Wt percent in zirconia |
|---|---|---|
| $Fe_2O_3$ | 0.025 | 0.10 |
| $TiO_2$ | 0.06 | 0.20 |
| $SiO_2$ | 32.7 | 0.30 |
| $Al_2O_3$ | 0.50 | 0.03 |
| Monazite Sand | 0.04 | — |
| Rare Earth Oxides | — | 0.10 |
| $ZrO_2$ (+ $HfO_2$) | 66.4 | 99.0 |

The zirconia particles may comprise from about 5 to about 30 wt percent of the product material but the preferred zirconia particle content of the material of the present invention is about 10 wt percent. The mean particle size for the zircon sand should be in the range from about 0.5 micrometers to about 20 micrometers, with the preferred means particle diameter being about 2.7 micrometers. The zirconia particles may have a mean particle diameter in the range from about 2.4 micrometers to about 95 micrometers, with a preferred means particle size of about 13 micrometers. Monoclinic zirconia particles are preferred, but partially stabilised zirconia particles may be used instead of monoclinic zirconia.

Thus, according to the present invention, there is provided a method of making a refractory ceramic material having a porosity of about 10% consisting essentially of a matrix of zircon containing from 5 to 30 wt percent of zirconia, said method comprising the steps of:

(a) milling a zircon sand having a purity of at least 97 percent until the milled zircon sand has a mean particle diameter in the range from about 0.5 micrometers to about 20 micrometers;

(b) milling zirconia particles having a purity of at least 97 percent until the milled particles have a mean particle diameter in the range from about 2.4 micrometers to about 95 micrometers;

(c) forming an admixture of the milled zircon sand and the milled zirconia particles, said admixture containing from about 5 wt percent to about 30 wt percent of zirconia;

(d) adding a fugitive binder to said admixture and mixing until the fugitive binder and zirconia particles are uniformly distributed in the admixture;

(e) moulding the product admixture of step (d) into a desired shape to form a green ware;

(f) heating the green ware to a firing temperature in the range from about 1400° C. to about 1800° C. at a rate of heating which ensures that the ware does not crack;

(g) holding the firing temperature for a predetermined period; and (h) allowing the fired ware to furnace cool to ambient temperature.

The predetermined period of step (g) may be from 0 to 5 hours, but is preferably abut 1 hour.

The product ware may be finished to a required tolerance by surface grinding.

The present invention also encompasses a material made by this method.

A more comprehensive disclosure of the present invention will not be given, and preferred embodiments of the invention will be described with reference to the accompanying drawings.

DETAILED DESCRIPTION OF INVENTION AND PREFERRED EMBODIMENTS

It has been noted already that the purity of the zircon sand and the zirconia particles is important, and must be (in each case) better than 97 percent. The preferred purity of each constituent is 99 percent.

Figure 1:
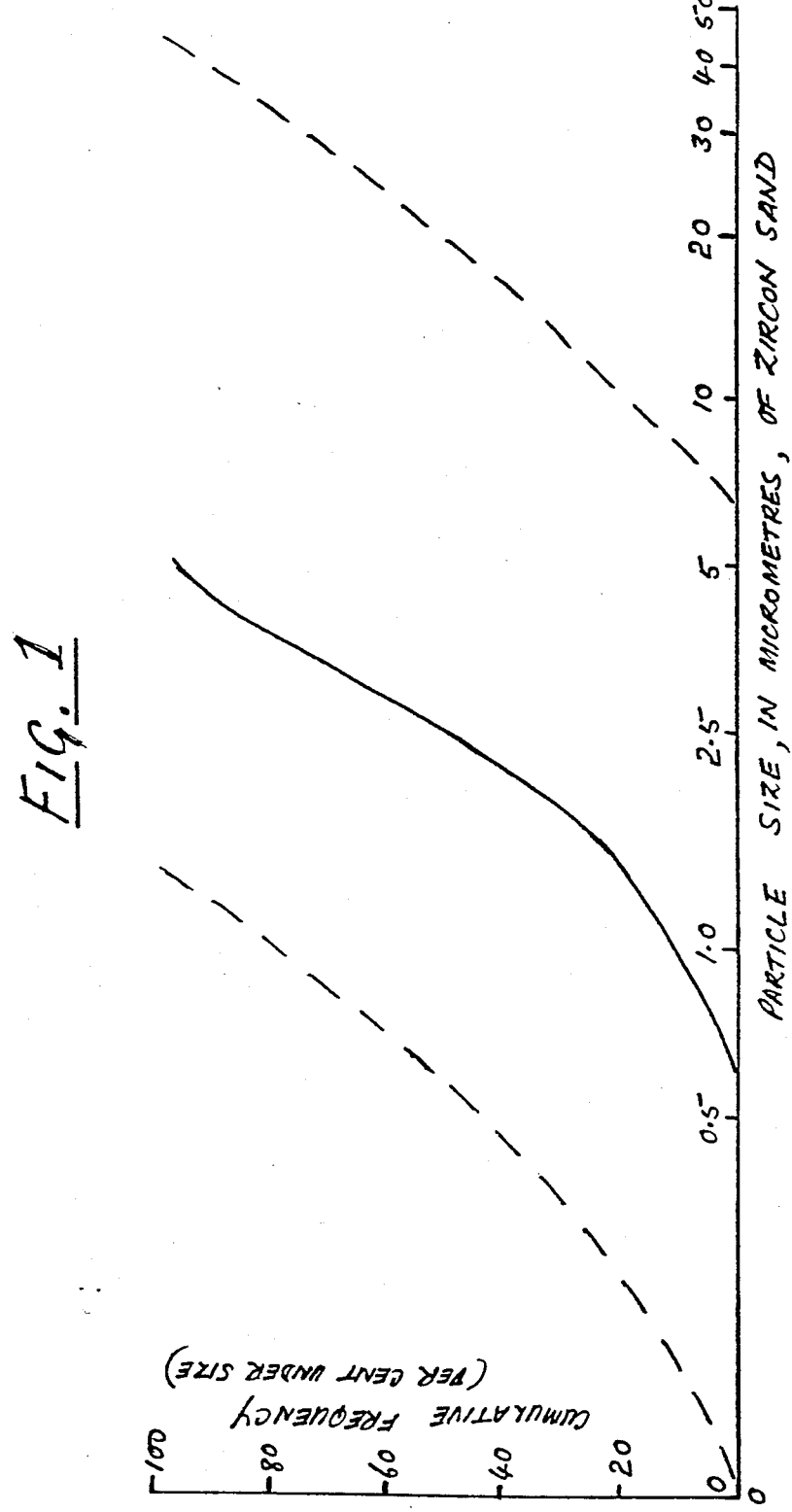
FIG. 1 is a graphical plot of cumulative frequency size distribution (ordinate) as a function of the logarithm of particle size (abscissa) for zircon sand.
Figure 2:
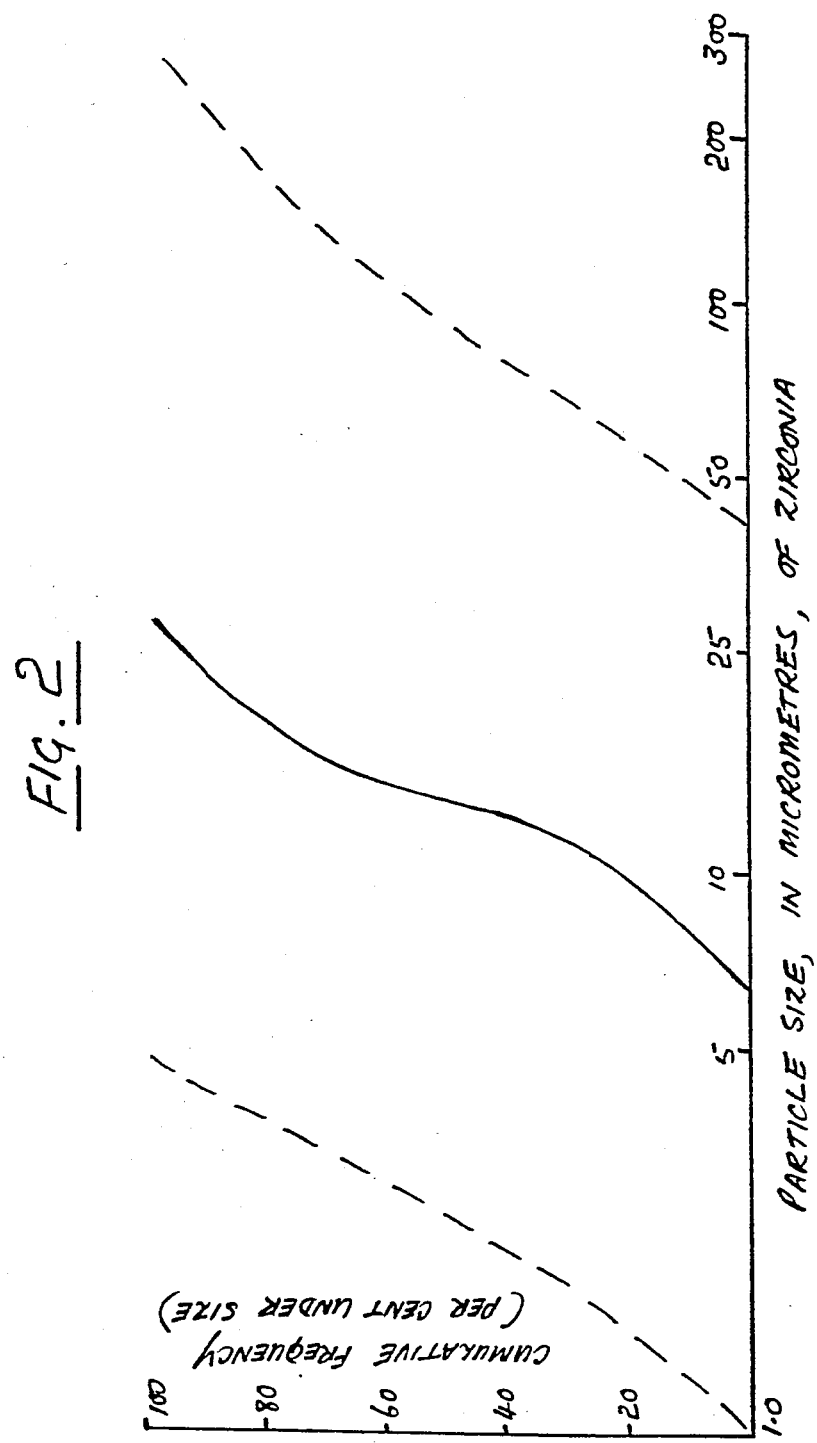
FIG. 2 is a similar graphical plot for zirconia particles.

Suitable particle size distributions for the zircon and zirconia phases of the material of the present invention are defined, respectively, by the regions in FIGS. 1 and 2 between the dashed lines. The preferred size distributions are indicated by the solid line in each Figure.

For the zircon sand, the preferred value of the mean particle size is about 2.7 micrometers, with 95 percent of all the particles being less than 5 micrometers in diameter. Zircon powders with this preferred particle size distribution sinter to a high density with a low value of shrinkage during firing. Acceptable materials can be made with particle size distributions characterised by values of the mean particle size within the range 0.5 micrometer to 20 micrometers. However, powders with means sizes at the lower end of this range would experience greater shrinkage during firing whilst powders with mean sizes at the upper end would sinter to a lesser extent and produce a more porous body. Blends of coarse, medium and fine particles may be made, as may blends of coarse and fine particles, provided all the particles have a size which is within the designated range indicated in FIG. 1. A green body formed from such blends would sinter to a high density with an acceptable low value of the shrinkage during firing, but this procedure would be more expensive than, and would provide no additional advantage over, milling zircon sand directly to the preferred size distribution.

The region containing acceptacle particle size distributions for the zirconia phase lies within the dashed lines shown in FIG. 2. The preferred size distribution has 100 percent of the particles less than about 27 micrometers, with a mean particle size of about 13 micrometers. This distribution is preferred because it causes only a relatively modest decrease in the original strength, before thermal shock, of the composite body (when compared to a body fabricated with a zircon phase only), but it renders the composite material extremely thermal shock resistant. Useful refractory ceramic materials can be made by adding zirconia particles having a mean particle size within the range from 2.4 to 95 micrometers. However, if the zirconia particles have a mean size near the lower limit of this range, the thermal shock resistance of the zircon-zirconia composite is reduced compared to that of a composite made with the preferred size distribution. If the composite is made with zirconia particles having a mean particle size near the upper limit of the acceptable range, then its strength both before and after thermal shock is reduced compared to that of the composite made with the preferred size distribution of the dispersed zirconia phase.

The preferred pure zirconia powder for the present invention has a monoclinic structure. Naturally occurring baddelyite with the required purity is one suitable source of such zirconia particles. It is possible to make a useful composite by using, instead, zirconia particles which have been partially stabilised with magnesia, calcia, or another oxide or a mixture of oxides. However, (a) this procedure is more expensive because the zirconia particles need to react with the stabiliser oxide or oxides before they are milled to the preferred size distribution, and (b) the increase in the thermomechanical properties when PSZ particles are used is only marginal.

To produce especially dense, strong and thermal shock resistant zircon-zirconia composite materials, the zirconia particles comprise about 10 wt percent of the product material. Zirconia particles of the preferred size distribution may be added so that they comprise from 5 to 30 wt percent of the product material but the thermomechanical properties of the resultant composite are less when the preferred concentration of about 10 wt percent is not used.

In step (d) of the statement of the present invention given earlier in this specification, a fugitive binder (typically 4 wt percent of the mixture) is added to a mixture of milled zircon sand and milled zirconia particles. However, instead of separately milling zircon sand and zirconia particles to form this mixture, coarse zirconia particles may be added to the zircon sand at some convenient time near the final stages of the milling of the zircon powder and the composite powder batch milled until both powders coincidentally attain their preferred size distribution. If wet-milling is used then, for convenience, a water soluble fugitive wax binder in the amount of 4 wt percent may be added to the composite powder batch during the milling stage.

In step (e) of the present invention, the composite powder batch may be moulded into the desired shape of die-pressing, and/or isostatic pressing, extrusion, slip-casting, injection moulding or any moulding technique used in the ceramics or refractories industry.

The heating of the green ware (step (f) of the present invention) must be at a rate such that cracking of the ware does not occur while the preferred holding temperature of 1600° C. is reached. A suitable heating rate is 80° C./hour, although faster rates may be used. The ware may be fired at any temperature in the range 1400° C. to 1800° C. but 1600° C. is the preferred temperature because it produces a high density product in a reasonable time. Ware with useful properties is made by sintering at temperatures near the lower limit of this range but such ware will be weaker and more porous than ware which is sintered at the preferred temperature of 1600° C. Ware sintered at temperatures near the upper limit of the range will be dense but will be more expensive to produce, due to the higher cost associated with the higher firing temperature. Also, the zircon matrix phase tends to dissociate measurably at temperatures above about 1670° C.

Ware with useful properties is produced by holding the firing temperature for a period in the range from 0 to 5 hours, but a holding time of one hour is preferred because this produces dense ware at a reasonable cost. Ware fired at times less than the preferred value have a lower strength and an increased porosity whilst ware fired for longer than one hour have only modest increases in density at considerable extra cost.

A particular advantage of the zircon-zirconia composites of the present invention over the currently used refractory guide PSZ refractories is that fabrication of the composites of the present invention is straightforward and quality control is easy to maintain. There is only a trace amount of glassy phase in the grain boundaries of the present composite material and this does not significantly degrade its performance during use. This is not the case with products made of refractory grade PSZ, the grains of which have a complex, multiphase micro-structure. In addition, it is difficult to control the phase composition of the PSZ materials, and this fact, combined with the invariable presence of glassy material in the grain boundaries, results in PSZ refractory products of widely varying quality and, hence, of very variable performance in use.

Sintered composite zircon-zirconia materials made in accordance with the parameters and procedures of the present invention will have the following characteristics:

1. The zircon matrix phase is comprised of grains of about 1 to 10 micrometers in diameter. The average grain size is about 3 micrometers in diameter. There is only a trace amount of glassy material in the grain boundaries and that trace produces no significant degradation of the performance of the product in use. The amount of such glassy phase is less than 3 wt percent of the material.
2. There is a dispersed phase consisting of intergranular particles of monoclinic zirconia. The preferred size distribution of these particles has a means particle size of about 13 micrometers with 100 percent of the particles less than 30 micrometers in diameter. The amount of the dispersed phase is in the range from 5 to 30 wt percent with the preferred material having a value of 10 wt percent of the material.
3. The bulk density of the sintered composite is at least 3.80 g/cc with the preferred material having a value of at least 4.25 gm/cc.

Figure 3:
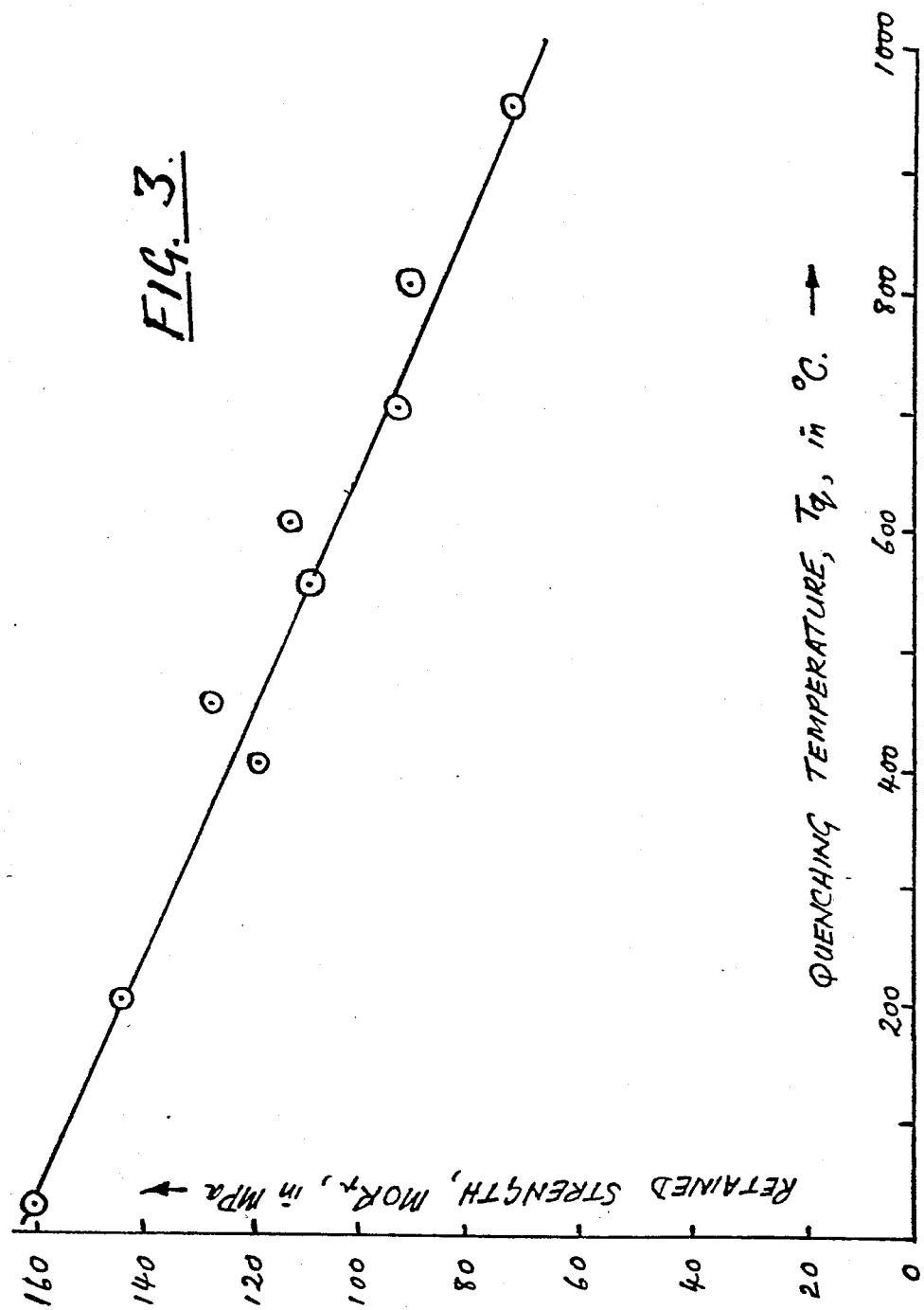
FIG. 3 shows the relationship between retained strength after thermal shock and the severity of the thermal shock, for materials produced in accordance with the present invention.

4. The apparent porosity of the composite is less than 18 percent, with the preferred material having a value less than 11 percent.
5. The initial strength of the composite before thermal shock is greater than 55 MPa, with the preferred material having a value greater than 135 MPa. A typical value of the initial strength is 154 MPa. The strength is estimated by measuring the flexural bend strength (modulus of rupture, MOR) in 4-point bending on samples in the form of bars of material which have been diamond ground to have the dimensions 3×3×40 mm. The distances between the knife-edges of the test rig used were 19 mm for the long span and 6 mm for the short span.
6. The strength degradation during a standard thermal shock test displays stable crack propagation as shown in FIG. 3, which is a plot of the strength retained after thermal shock ($MOR_r$) plotted as a function of the quenching temperature ($T_q$) to which the samples had been heated prior to quenching into a water bath maintained at room temperature (25° C.). The steady, linear decrease in the value of $MOR_r$ as $T_q$ increases is indicative of stable crack propagation in the composite. The samples used in this test were similar to those used for the 4-point bending test referred to in the previous paragraph.
7. The linear shrinkage during firing of the composite is less than 17 percent with the preferred material having a value of about 13 percent.
8. The value of $MOR_r$ when $T_q = 950°$ C. is at least 25 percent of the initial value of the MOR before thermal shock ($MOR_i$). A preferred value of $MOR_r$ is 47 percent of $MOR_i$. The data in this paragraph are in respect of samples prepared as detailed in paragraph 5, above.

When samples of the zircon-zirconia composites of the present invention were compared with samples of a conventional zircon refractory, the data presented in Table 2 were obtained.

TABLE 2

Comparison of Properties of Zircon-Zirconia Composite and a Commercial Clay-bonded Zircon Refractory Material

| Properties Measured | Zircon-Zirconia Composite | Clay-bonded Zircon |
|---|---|---|
| $MOR_i$ (MPa) | 154 | 22 |
| Apparent porosity (%) | 10 | 21 |
| Thermal shock resistance parameter, $R_{st}$ ($M^{\frac{1}{2}}K^{-1}$) | 3.6 | 3.5 |

It will be seen that the new composite material of the present invention has seven times the initial strength of the commercial refractory, about one-half the apparent porosity, yet has about the same thermal shock resistance as defined by the parameter, $R_{st}$.

INDUSTRIAL APPLICATION

Applications of the zircon-zirconia composite materials of the present invention include tundish pouring nozzles, foundry crucibles, sliding gates and in other devices used in the containment and handling of molten metals. The relative value of the present invention, in an economical sense, is seen from the fact that at present (that is, in 1984) a pouring nozzle made from PSZ refractory materials costs about $A7.00, a similar nozzle made from DZ-zirconia composite costs about $A5.00, while the same nozzle made by the present invention, will cost about $A3.00.

I claim:
1. A method of making a refractory ceramic material having a porosity of about 10% consisting essentially of a matrix of zircon containing from 5 to 30 wt percent of zirconia, said method comprising the steps of:
    (a) milling a zircon sand having a purity of at least 97 percent until the milled zircon sand has a means particle diameter in the range from about 0.5 micrometer to about 20 micrometers;
    (b) milling zirconia particles having a purity of at least 97 percent until the milled particles have a mean particle diameter in the range from about 2.4 micrometers to about 95 micrometers;
    (c) forming an admixture of the milled zircon sand and the milled zirconia particles, said admixture containing from about 5 wt percent to about 30 wt percent of zirconia;
    (d) adding a fugitive binder to said admixture and mixing until the fugitive binder and zirconia particles are uniformly distributed in the admixture;
    (e) moulding the product admixture of step (d) into a desired shape to form a green ware;
    (f) heating the green ware to a firing temperature in the range from about 1400° C. to about 1800° C. at a rate of heating which ensures that the ware does not crack;
    (g) holding the firing temperature for a period in the range of 1 to 5 hours; and
    (h) allowing the fired ware to furnace cool to ambient temperature.
2. A method of making a refractory ceramic material having a porosity of about 10% consisting essentially of a matrix of zircon containing from 5 to 30 wt percent of zirconia, said method comprising the steps of
    (a) milling a zircon sand having a purity of at least 97 percent until the milled zircon sand has a mean particle diameter in the range from about 0.5 micrometer to about 20 micrometers;
    (b) adding zirconia particles having a purity of at least 97 percent to the zircon sand during the course of the milling thereof, to form an admixture of zircon sand and zirconia, and milling the admixture until the zircon sand particles have the said mean particle diameter and the zirconia particles have a mean particle diameter in the range from about 2.4 micrometers to about 95 micrometers;
    (c) adding a fugitive binder to the milled admixture of zircon sand and zirconia particles, and mixing until the fugitive binder is uniformly distributed in the admixture;
    (d) moulding the product admixture of step (c) into a desired shape to form a green ware;
    (e) heating the green ware to a firing temperature in the range from about 1400° C. to about 1800° C. at a rate of heating which ensures that the ware does not crack;
    (f) holding the firing temperature for a period in the range of 1 to 5 hours; and
    (g) allowing the fired ware to furnace cool to ambient temperature.
3. A method as defined in claim 1, in which the firing temperature is about 1600° C.
4. A method as defined in claim 2, in which the firing temperature is about 1600° C.
5. A method as defined in claim 2, in which

(a) the milled zircon sand has a mean particle diameter in the range from about 2 micrometers to about 7 micrometers, and at least 95 percent of particles in the milled zircon sand have a diameter of less than 5 micrometers; and (b) the milled zirconia particles all have a diameter less than about 27 micrometers, with the mean zirconia particle diameter being about 13 micrometers.

6. A method as defined in claim 1, in which (a) the milled zircon sand has a mean particle diameter in the range from about 2 micrometers to about 7 micrometers, and at least 95 percent of particles in the milled zircon sand have a diameter of less than 5 micrometers; and (b) the milled zirconia particles all have a diameter less than about 27 micrometers, with the mean zirconia particle diameter being about 13 micrometers.

7. A method as defined in claim 1, in which the zirconia concentration consists essentially of about 10 wt per cent of the zircon matrix.

8. A method as defined in claim 2, in which the zirconia concentration consists essentially of about 10 wt percent.

9. A method as defined in claim 5, in which the zirconia concentration consists essentially of about 10 wt percent.

10. A method as defined in claim 2, in which (a) the zircon sand particles in the milled zircon sand and zirconia admixture have a mean particle diameter in the range from about 2 micrometers to about 7 micrometers, and at least 95 percent thereof have a diameter of less than 5 micrometers; and (b) the zirconia particles in the milled zircon sand and zirconia admixture all have a diameter less than about 27 micrometers, and the mean particle diameter thereof is about 13 micrometers.

11. A method as defined in claim 4, in which (a) the zircon sand particles in the milled zircon sand and zirconia admixture have a means particle diameter in the range from about 2 micrometers to about 7 micrometers, and at least 95 percent thereof have a diameter of less than 5 micrometers; and (b) the zirconia particles in the milled zircon sand and zirconia admixture all have a diameter less than about 27 micrometers, and the mean particle diameter thereof is about 13 micrometers.

12. A method as defined in claim 2, in which the zirconia concentration consists essentially of about 10 wt percent of the zircon matrix.

13. A method as defined in claim 4, in which the zirconia concentration consists essentially of about 10 wt percent.

14. A method as defined in claim 7, in which the zirconia concentration consists essentially of about 10 wt percent.

* * * * *